(No Model.)
F. SWENSON.
INSECT TRAP.
No. 464,400. Patented Dec. 1, 1891.
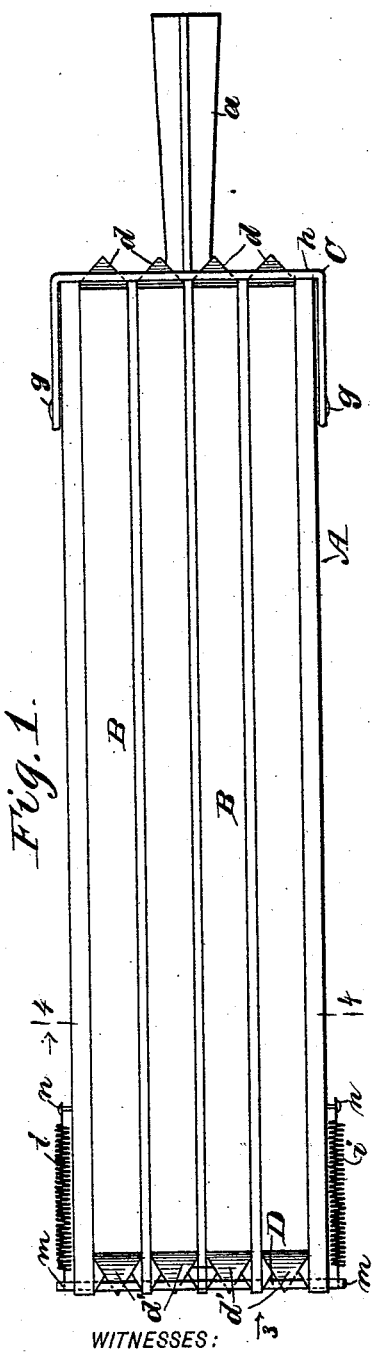
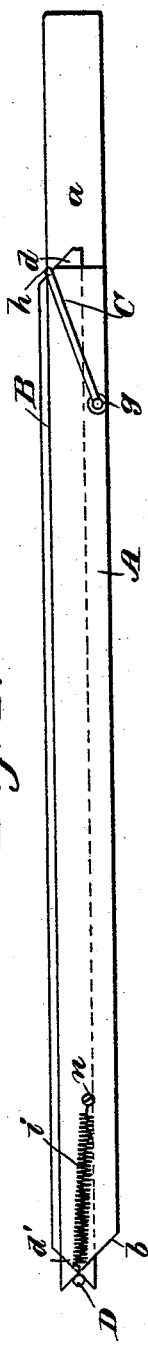
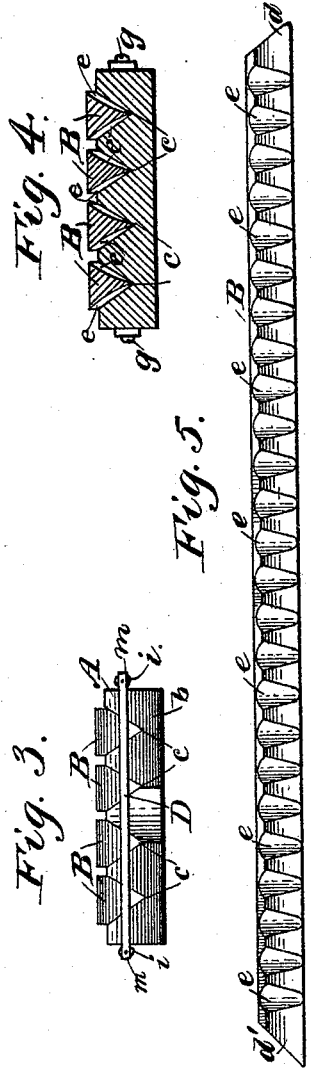
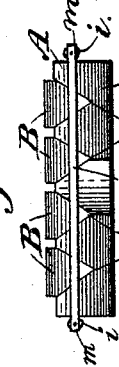
WITNESSES:
INVENTOR:
F. Swenson
BY Munn & Co
ATTORNEYS

UNITED STATES PATENT OFFICE.

FREDERICK SWENSON, OF BELVIDERE, ILLINOIS.

INSECT-TRAP.

SPECIFICATION forming part of Letters Patent No. 464,400, dated December 1, 1891.

Application filed June 15, 1891. Serial No. 396,243. (No model.)

*To all whom it may concern:*

Be it known that I, FREDERICK SWENSON, of Belvidere, in the county of Boone and State of Illinois, have invented a new and useful Improvement in Insect-Traps, of which the following is a full, clear, and exact description.

This invention has for its object to provide a simple inexpensive trap for the capture of bedbugs; and it consists of a portable device arranged to afford numerous resting and breeding places for the bugs when placed in a bed, and that may be quickly removed therefrom and opened to permit the destruction of the insects and eggs collected therein.

The invention further consists in the construction and combination of parts, as is hereinafter described and claimed.

Reference is to be had to the accompanying drawings, forming a part of this specification, in which similar letters of reference indicate corresponding parts in all the figures.

Figure 1 is a plan view of the device. Fig. 2 is a side view. Fig. 3 is an end view opposite the arrow 3 in Fig. 1. Fig. 4 is a transverse section on the line 4 4 in Fig. 1, and Fig. 5 is a detached side view of one of a series of bars that are essential portions of the trap.

There is a stock-board A provided, which is preferably made of wood, rectangular in outline and parallel on the top and bottom sides, of proper dimensions for effective service. At one end of the stock A the handle $a$ is projected for the convenient manipulation of the device, and at the opposite end the material of the stock-board is sloped upwardly and outwardly, as at $b$ in Fig. 2. A series of evenly-spaced grooves $c$ are produced in the top surface of the stock-board, which are of equal depth, are V-shaped in cross-section, and extend throughout the length of said board. A set of closing-bars B, equal in number with the grooves $c$, are furnished, which are formed to fit in these grooves and project a proper distance above the top surface of the stock-board A when embedded in the grooves. The closing-bars B are alike in construction, and each have the ends $d\ d'$ sloped from the flat top surface downwardly and outwardly, as represented in Fig. 5.

A series of shallow channels $e$ is cut in each side of all of the closing-bars B, which channels are preferably scalloped at even distances apart throughout the length of the bars, extending from the top surface downwardly and made wider and deeper above, each channel affording a nest for one or more bedbugs to harbor and breed in.

At the end of the stock-board A nearest to the handle $a$ a bail-clamp C is pivotally secured by its ends to the sides of the board, as at $g$, oppositely near the lower surface, so that the cross-bar $h$ of the bail-clamp will engage the sloped ends $d$ of the closing-bars B and prevent a longitudinal movement of said bars in the grooves $c$ toward the handle $a$. A keeper-bar D is located at the opposite end of the stock-board A, and made to engage the sloped end of said board and the sloped ends $d'$ of the closing-bars B, and as the ends of the bars are inclined in a direction opposite to the inclination of the stock-board end a retaining-groove is thus produced for the reception of the keeper-bar. Preferably the keeper-bar D is held in the position just mentioned by the spiral springs $i$, that are attached to the ends $m$ of the bar and also to the sides of the stock-board, as at $n$, the resilience of the springs serving to hold the bar interlocked with the parts it engages and thus retain the closing-bars B seated in the grooves $c$ when in position, a dislodgment of the keeper-bar being readily effected if it is pulled outward and upward or downward to remove it from the closing-bars, which may then be removed, if this is desired.

In use the bug-trap is placed in a bed at any suitable point, and if the bed is infested by bedbugs these will seek the trap and enter the channels $e$, as it is well-known that these vermin prefer crevices in wooden structures to rest in and lay their eggs.

The traps should be examined by daylight, and when opened the bugs and eggs they have deposited in the channels $e$ should be removed by an application of hot water to the parts of the trap, which may be again placed in the bed to entrap more of the vermin until they are exterminated.

Having thus fully described my invention, I claim as new and desire to secure by Letters Patent—

1. An insect-trap comprising a board longitudinally grooved to receive closing-bars and provided with a bar for each groove having nesting-channels in its sides and further provided with means to retain said bar removably in the grooves, substantially as described.

2. An insect-trap comprising a stock-board having a handle at one end, a series of V-shaped grooves in its top surface, a mating series of closing-bars therefor, each bar having series of insect-nesting channels in its sides that are embedded in the grooves of the board, and a device to retain the closing-bars removably within the grooves of the stock-board, substantially as described.

3. In a bedbug-trap, the combination, with a longitudinally-grooved stock-board having one end chamfered, a handle at the opposite end, and a swinging bail-clamp at said end, of a series of closing-bars adapted to fit within the stock-board grooves, sloped at each end and provided with numerous nesting-channels, a keeper-bar, and springs therefor, substantially as described.

FREDERICK SWENSON.

Witnesses:
JAMES H. COOK,
JOHN SIGURD.